United States Patent
Tsai et al.

(10) Patent No.: US 8,194,144 B2
(45) Date of Patent: Jun. 5, 2012

(54) IMAGE DATA PROCESSING METHOD

(75) Inventors: Ching-Jung Tsai, Taichung (TW); Po-Ching Wu, Taichung (TW)

(73) Assignee: Asia Optical Co., Inc., Tepz, Taichung (TW)

(*) Notice: Subject to any disclaimer, the term of this patent is extended or adjusted under 35 U.S.C. 154(b) by 660 days.

(21) Appl. No.: 12/334,560

(22) Filed: Dec. 15, 2008

(65) Prior Publication Data

US 2009/0160964 A1    Jun. 25, 2009

(30) Foreign Application Priority Data

Dec. 21, 2007    (TW) ................................ 96149227 A

(51) Int. Cl.
*H04N 5/225* (2006.01)
(52) U.S. Cl. .................................................... 348/220.1
(58) Field of Classification Search ............... 348/220.1, 348/231.2, 231.6
See application file for complete search history.

(56) References Cited

U.S. PATENT DOCUMENTS

| | | | |
|---|---|---|---|
| 5,703,638 A * | 12/1997 | Ohta et al. ................. | 348/220.1 |
| 6,680,748 B1 * | 1/2004 | Monti ........................ | 348/220.1 |
| 6,963,374 B2 * | 11/2005 | Nakamura et al. ......... | 348/220.1 |
| 7,528,865 B2 * | 5/2009 | Saito .......................... | 348/220.1 |
| 7,632,158 B2 * | 12/2009 | Denpouya et al. ........... | 439/752 |
| 7,986,876 B2 * | 7/2011 | Cha ........................... | 348/220.1 |
| 2002/0196348 A1 * | 12/2002 | Kubo ........................ | 348/220.1 |
| 2004/0109067 A1 | 6/2004 | Yokoi | |
| 2006/0171038 A1 * | 8/2006 | Hung et al. .................. | 359/691 |
| 2006/0256203 A1 * | 11/2006 | Honma ..................... | 348/220.1 |
| 2008/0112689 A1 * | 5/2008 | Yokoi .......................... | 386/117 |
| 2011/0063463 A1 * | 3/2011 | Ejima et al. ................ | 348/220.1 |
| 2011/0221916 A1 * | 9/2011 | Kuriyama .................. | 348/220.1 |

* cited by examiner

*Primary Examiner* — Aung S Moe
(74) *Attorney, Agent, or Firm* — Thomas|Kayden

(57) ABSTRACT

An image data processing method to capture still images while capturing motion images is disclosed. The method includes stopping a motion image capturing according to a first instruction to generate a first motion image data with a first resolution, thereafter, carrying out live view at a predetermined time; outputting the image data in the predetermined time and generating a first temporal motion data with a second resolution; capturing a still image data according to a second instruction after the predetermined time; transforming the first temporal motion data and the still image data and generating a second motion image data by combining the transformed data with the first motion image data. The method and device according to the present invention can be used in a camera to capture still images while capturing motion images.

8 Claims, 4 Drawing Sheets

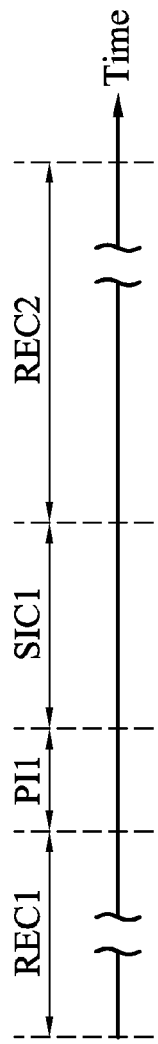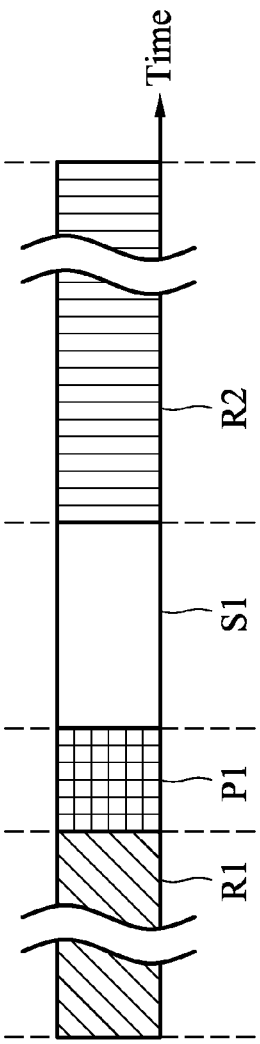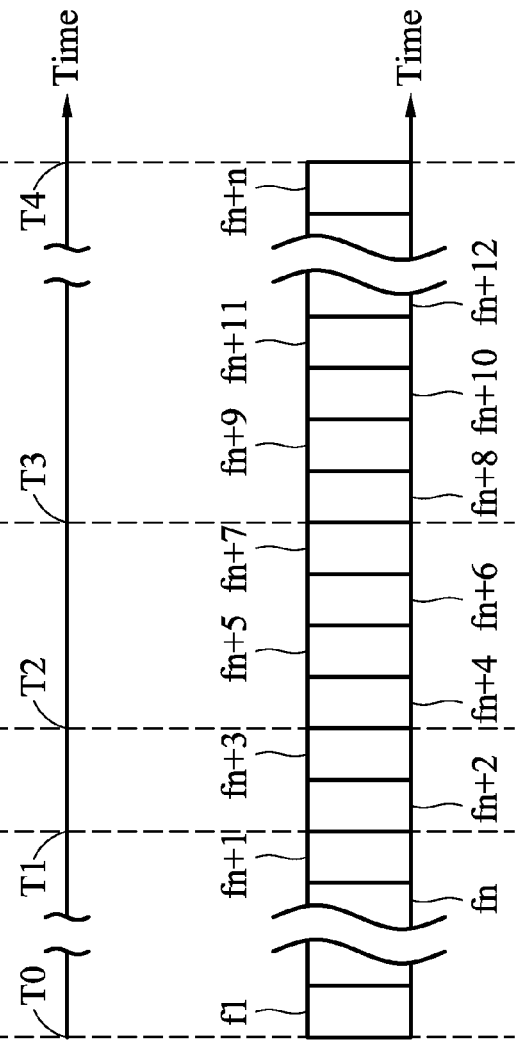

IMAGE DATA PROCESSING METHOD

CROSS REFERENCE TO RELATED APPLICATIONS

This Application claims priority of Taiwan Patent Application No. 096149227, filed on Dec. 21, 2007, the entirety of which is incorporated by reference herein.

BACKGROUND OF THE INVENTION

1. Field of the Invention

The present invention relates to an image processing method, and more particularly to an image data processing method to capture still images while capturing motion images.

2. Description of the Related Art

Image capturing technology developed from capturing still images to capturing motion images. Capturing and recording of conventional motion images is performed by successively capturing a plurality of frames, i.e., still images. If a user wants to capture some frames of motion images or compare or analyze still images, the convention image capture method captures a plurality of frames of the motion images. Still images can be output in the form of a picture and can be edited by software.

Please refer to FIG. 1. FIG. 1 is a schematic diagram of a conventional motion image file. Typically, the conventional motion image file is made up of a plurality of frames of serially connected still images f1~fn. The still images f1~fn are captured with VGA resolution, thus, the resolution of the still images f1~fn is 640×480 pixels. A first motion image file is made up of serially connected still images f1~fn with the resolution of 640×480 pixels. If a still image capture operation is applied to the first motion image file, the resolution of the captured still image can only be as high as 640×480 pixels due to the resolution of the original still images f1~fn, thus possibly not meeting a users demand.

A still image capture device that captures still images while capturing motion images is disclosed in U.S. Pub. No. 200410109067A1. The image capture device copies the last still image output by the image capture element inside of the image capture device, and the last still image is filled to compensate the lost part of the motion image file. Thus, the quality of smooth showing is minimally influenced when playing the motion image file. However, if the capturing time of the still image capture operation is too long, i.e., the interrupt time of capturing the motion images may be too long, and accordingly the motion image data may be loss. Thus, when viewing the motion image data, the quality of smooth showing would be negatively affected as too many same still images would be used as compensation for the motion image data. Therefore, the above described capturing method, given the examples of the motion image file, results in a poorer smooth showing quality. As such, an image processing method capable of improving the quality of the motion image file is desirable.

BRIEF SUMMARY OF THE INVENTION

An embodiment of the invention provides an image processing method comprising the following steps: 1) stopping capturing motion image according to a first instruction to generate a first motion image data with a first resolution, thereafter, carrying out live view at a predetermined time; 2) outputting the previewed first motion image data at the predetermined time and generating a first temporal motion data with a second resolution; 3) capturing a still image data according to a second instruction after the predetermined time; 4) transforming the first temporal motion data and the still image data, and generating a second motion image data by combining the transformed data with the first motion image data.

Another preferred embodiment uses the image data when previewing the still images and uses the acquired still image data to compensate for the lost image data of the first motion image data when the still image is being captured. The compensation method calculates the number of frames, P, according to the frame rate of the first motion image, n, and the acquisition time of the still image, m, where P=m×n. The image capture device copies and generates P frames of the still image and combines the P frames of the still image with the first temporal data to generate a second motion data.

According to the described image processing device, even if the still image capture operation is long, the phenomenon of the discontinuous image can be avoided.

The embodiments of the invention provide an effective image process method to capture high resolution still images when capturing the motion images, and according to the image processing device of the embodiments, a video file is also acquired with the same image quality of the motion image data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2A shows a schematic diagram of the operation of an embodiment of an image capture device, and more particularly, of the operation where a frame of a still image is captured during two processes of capturing a motion image REC1 and REC2.

FIG. 2B shows the output of the image capture device corresponding to the operation in FIG. 2A.

FIG. 2C shows a schematic timing diagram of the operation of the image capture device FIG. 2D is a schematic diagram of a motion data.

DETAILED DESCRIPTION OF THE INVENTION

Figure 1:
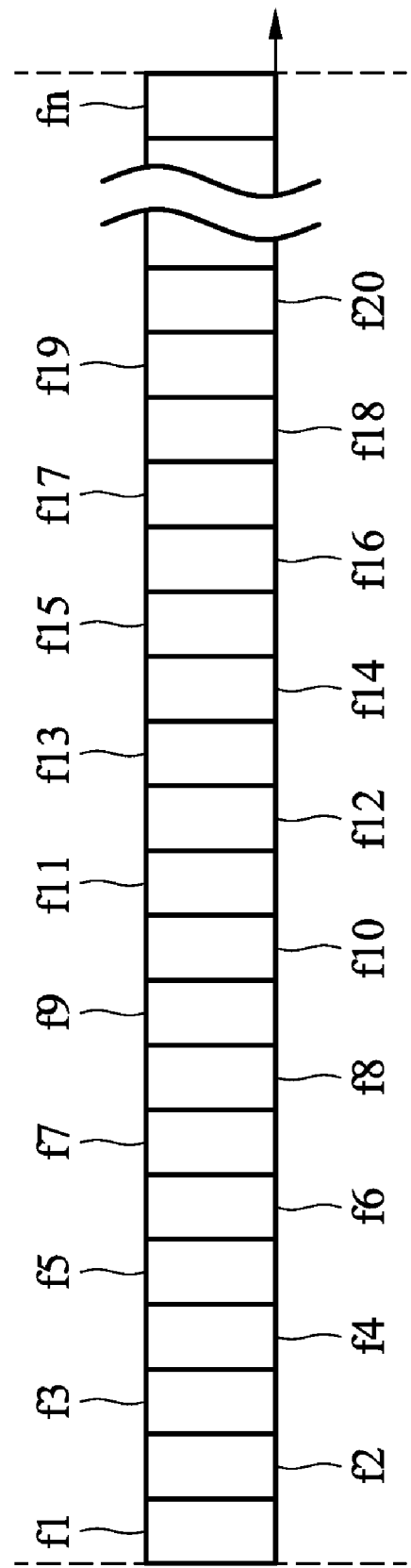
FIG. 1 is a schematic diagram of a conventional motion image file.

The following description is of the best-contemplated mode of carrying out the invention. This description is made for the purpose of illustrating the general principles of the invention and should not be taken in a limiting sense. The scope of the invention is best determined by reference to the appended claims.

The embodiment of the present invention relates to a still image capture method and device to capture still images while capturing motion images, wherein the still image capture method and device can be applied in an image capture device.

FIG. 2A shows a schematic diagram of the operation of an embodiment of an image capture device, and more particularly, of the operation where a frame of a still image is captured during two processes of capturing a motion image REC1 and REC2. Before the still image capture process SIC1, the image capture device executes a first still image preview process PI1, and executes the still image capture process SIC1 when receiving an instruction.

FIG. 2B shows the output of the image capture device corresponding to the operation in FIG. 2A. An image capture element sequentially outputs a first motion image R1, a first temporal motion data P1 and a first still image data S1. The image capture element outputs the first motion image R1 when the first motion image is being captured REC1. The image capture element outputs the first temporal motion data P1 during the first still image preview process PI1. The image capture element outputs the first still image data S1 during the still image capture process SIC1 and then outputs a second motion data R2 when the second motion image is being captured REC2.

As shown in FIG. 2C, a schematic timing diagram of the operation of the image capture device is provided. In reference also with FIGS. 2A and 2B, at a time T0, a user presses a shutter button to send a start instruction and accordingly the image capture device starts executing the process for capturing a first motion image REC1. At time T1, when the shutter button is half-pressed, a first instruction is sent and the image capture device accordingly starts executing the first still image preview process PI1. At time T2, when the shutter is pressed down after being half-pressed, a second instruction is sent and the image capture device accordingly starts executing the still image capture process SIC1 to capture the first still image data S1. At time T3, the image capture device is automatically switched to the function of capturing a motion image to execute the second process of capturing a motion image REC2 to output the second motion data R2. At time T4, when the shutter button is pressed down again, a finish instruction is sent and consequently the second operation of capturing a motion image REC2 is stopped and the image capture device switches to a standby mode.

FIG. 2D is a schematic diagram of a motion data. When the image capture device executes the process of capturing a motion image, the motion data is made up of a plurality of serial frames, f1~fn+n.

Specifically, the image capture device is in the standby mode before a start instruction be sent and the process of capturing a motion image. At this time, the output image data of the image capture device is only displayed by a display unit and the image data is not stored in the image capture device. At time T0, the shutter button is pressed down, a start instruction is accordingly sent and the image capture device executes the first process of capturing a motion image REC1. During the REC1 process, the image capture device outputs a first motion data R1 with a first resolution. The image capture device processes the first motion data R1 to sequentially generate a plurality of serial frames, f1~fn+n, with the first resolution according to a predetermined rate, wherein the first resolution may be 640 pixel ×480 pixel. At time T1, the shutter button is half-pressed to send the first instruction, the image capture device accordingly stops the first capturing a motion image REC1 process, and processes the motion data to generate a first motion data R1 with the first resolution. The frame rate of the first motion data R1 is n frames/second, wherein one preferred embodiment of n is 30. During the first still image preview process PI1, the image capture device have some operation, for example a focusing, a white balance correcting, exposure value calculating, and so on, and generate and store a first temporal motion data P1 with a second resolution, wherein one preferred embodiment of the second resolution is 720 pixel ×480 pixel. At time T2, the shutter is pressed further after being half-pressed and a second instruction is sent to execute the still image capture process SIC1 to capture the first still image data S1 with a third resolution, wherein the third resolution is determined based on the size of the image sensor in the image capture device, wherein the third resolution may be 3648 pixel ×2736 pixel or 3264 pixel ×2448 pixel. After m seconds, the still image is completely output and the second operation of capturing a motion image REC2 is automatically executed to output the second motion data R2, wherein m is the capture time of the still image data and m may be 1, 1.2 or 2.3 seconds. The image capture device processes the first still image data S1 to generate a still image file and processes the frames fn+4~fn+7 of the first still image data S1 to generate a second temporal image data with the first resolution. The frame rate is n frames/second. The image capture device further converts the first temporal data P1 to a preview image data with the first resolution, wherein the first temporal data corresponds to the frames fn+2~fn+3. The image capture device sequentially combines the first motion data R1, the preview image data converted from the first temporal data P1 and the second temporal image data converted from the first still image data S1 to generate a second motion data. At time T3, when the shutter button is pressed down, the image capture device stops the motion data capturing operation and returns to a standby mode.

The generation method of the second temporal motion data comprises the following steps: 1) calculating the number P of frames of motion data during the capturing time of the still image data; 2) converting the first still image data S1 to data with the first resolution; and 3) duplicating and serially connecting the P frames to generate the second temporal motion data. More specifically, the number P of frames of the second temporal motion data can be calculated by the equation, $P=m*n$. It assumed that the still image data is captured for a capturing time, m seconds, and recording motion data with a frame rate of n frames/second, the number P of frames of the second temporal motion data can be calculated by the aforementioned equation, $P=m*n$. For example, if the frame rate of the motion data is 30 frames/second, and the capturing time is 2 seconds, the number P of frames of the still image data is 60 (2 ×30). This also represents that the motion data has 60 frames during the capturing time of 2 seconds.

The resolution of the output image from the image capture device can be determined by a user or others. Therefore, the image capture device can control the first resolution of the first temporal motion data P1 after the image capture device is set.

Figure 3:
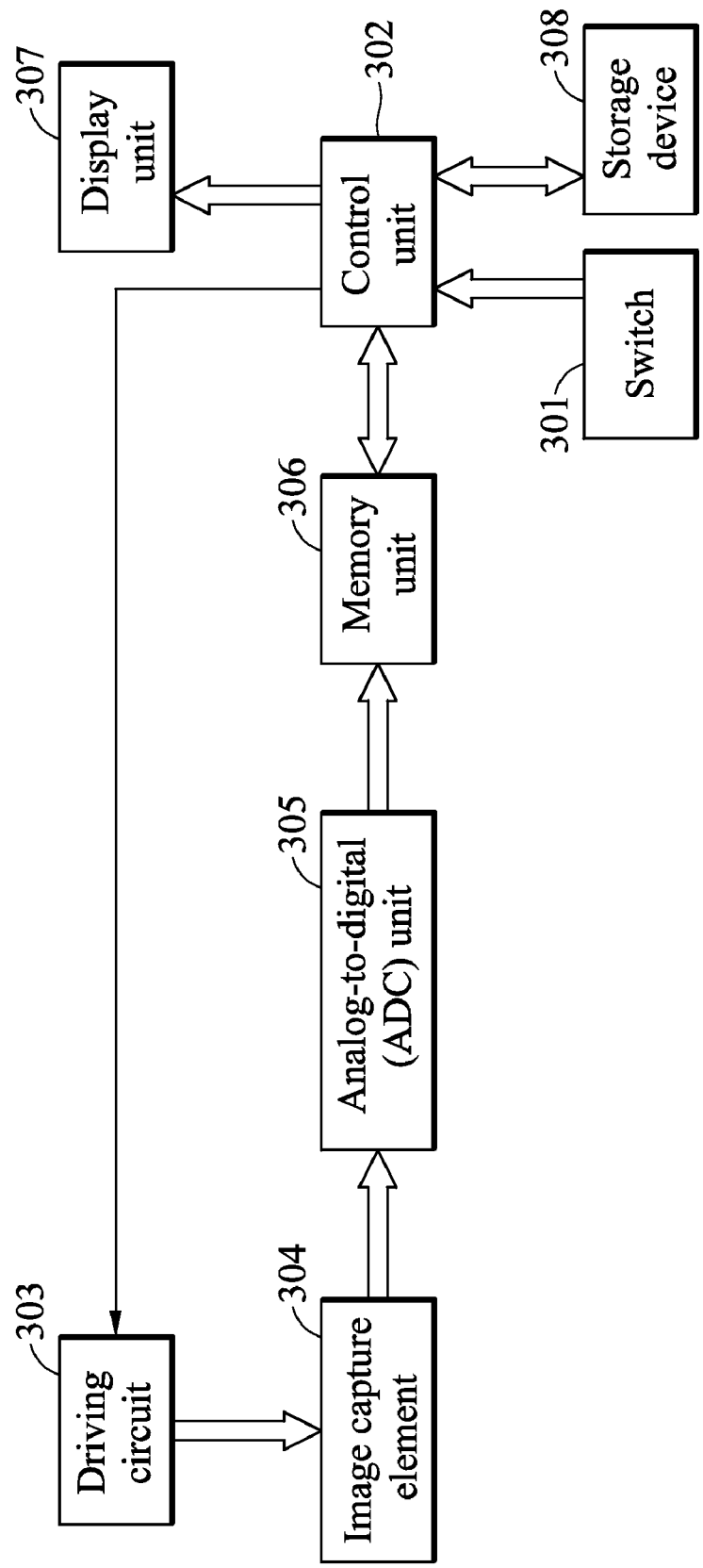
FIG. 3 is a circuit diagram of an embodiment of an image capture device according to the invention.

Please refer to FIG. 3. FIG. 3 is a circuit diagram of an embodiment of an image capture device according to the invention.

The image capture device comprises a switch 301, a control unit 302, a driving circuit 303, an image capture element 304, an analog-to-digital (ADC) unit 305, a memory unit 306, a display unit 307 and a storage device 308.

The switch 301 starts and stops a plurality of mode operations of the image capture device. The switch 301, which is a shutter button, sends instructions to execute different mode operations according to whether the shutter button is half-pressed or pressed down.

The control unit 302 controls the operation, input signals and the determination of the elements shown in FIG. 3. The control unit 302 first starts by outputting signals to the driving circuit 303, and finishes the image capture element 304 operations or controls the image capture element 304 to execute the mode-switching operation, wherein the control unit 302 is a digital signal processor (DSP) or a central processing unit (CPU).

The driving circuit 303 drives the image capture element 304 and controls the operation of the image capture element 304 according to the input instruction.

The image capture element 304 senses the light beam reflected by the object being photographed and outputs batches of analog motion image signals or analog still image signals according to the motion image output mode signal or the still motion image output mode signal from the control unit 302.

The ADC unit 305 converts the analog signals from the image capture element 30 into digital signals and transmits the digital signals to the control unit 302 for further processing.

The memory unit 306 temporally stores data and the control unit 302 can rapidly read or write data to the memory unit 306.

The display unit 307 shows the preview image before the still image data is captured, and the motion image data or still image data is stored in the memory unit 306 or the storage unit 308. Users can browse or view the image on the display unit 307.

When the image capture device is turned on, the image capture device enters into the standby mode. The control unit 302 sends a control signal to the driving circuit 303 to start the image capture element 304. The image capture element 304 outputs image data under the motion image output mode and the display unit 307 displays the image data. If the switch 301 is pressed down, the start instruction is sent and the ADC unit 305 transforms the analog motion image data from the image capture element 304 into the digital motion image data. The digital motion image data is temporally stored in the storage unit 308 and processed by the control unit 302. After the control unit 302 processes the digital motion image data, the first motion image R1 is generated and stored in the memory unit 36. The control unit 302 controls the display unit 307 to display the first motion image R1 stored in the memory unit 36 and users can browse or view the image on the display unit 307. The first motion image R1 is written to the storage unit 308, wherein the resolution of the first motion image R1 is the first resolution and the frame rate of the first motion image R1 is n frames/second.

When the first motion image is being captured REC1, the switch 301 is half-pressed to trigger the first instruction. When the control unit 302 receives the first instruction from the switch 301, the control unit 302 stops writing the first motion image R1 to the storage unit 308 and executes a preview operation PI1. During the preview operation PI1, a focus operation, a white balancing operation and an exposure operation to an object being photographed are executed. The control unit 302 generates and transmits a first temporal motion data P1 to the display unit 307 for display. The control unit 302 processes the first temporal motion data P1 to generate and store the preview image data with the first resolution. When the switch 301 is further pressed after being half-pressed, a second instruction is sent to the control unit 302. The control unit 302 starts a time counting operation and outputs signals to the driving circuit 303 to switch the mode of the image capture element 304 to the still image output mode and the image capture element 304 outputs the first still image data S1. After the first still image data S1 is completely output, the control unit 302 stops the time counting operation and sends an enable signal to the driving circuit 303 to switch the mode of the image capture element 304 from the still image output mode to the motion image output mode to output the second motion image data R2. The control unit 302 transforms the first still image data S1 into a still image file and writes the still image file to the storage unit 308. The control unit then calculates the value of P according to a predetermined algorism. The control unit 302 processes the first still image data S1 to generate and store a second temporal motion data with the first resolution to the storage unit 308, wherein the second temporal motion data comprises P frames. The control unit 302 combines the first motion image data R1, the preview image data and the second temporal motion data to generate and write the second motion data to the storage unit 308, wherein the calculation of P is the product of the frame rate n of the first motion image data R1 and the time counting operation of the control unit 302. The number of P is the number of the frames of the motion image data during the capturing time of the first still image data S1.

When the switch 301 is pressed down again, a finish instruction is sent to the control unit 302 and the control unit 302 stops writing the second motion image data R2 to the storage unit 308 and the image capture devices return to the standby mode.

Figure 4:
FIG. 4 is a flowchart of an embodiment of an image data processing method to capture still images while capturing motion images in accordance with the invention.

Please refer to FIG. 4. FIG. 4 is a flowchart of an embodiment of an image data processing method to capture still images while capturing motion images in accordance with the invention.

The still image capture method during capturing the motion images operation comprises the following steps.

Step (A): During the standby mode, when the shutter button is pressed down, the operation for capturing the motion images is started and a first motion image data with the first resolution is stored.

Step (B): When the shutter button is half-pressed, the operation of the step (A) is stopped and a preview operation is executed, wherein the preview image data is transformed into the first motion image data with the first resolution.

Step(C): When the shutter button is further pressed after being half-pressed, the image capture device captures the first still image data and after the first still image data is completely captured, the operation for capturing the motion images is started again. The first still image data is transformed into a still image file and a second temporal motion data with the first resolution. The second motion data is then generated by sequentially combining the first motion image data, the preview image data and the second temporal motion data.

Step(D): When the shutter button is pressed down again, the operation for capturing the motion images is stopped and the image capture device returns to the standby mode.

More specifically, the method further comprises the following steps.

Step 1: As shown in step S101. The image capture device is at a standby mode.

Step 2: As shown in step S102. It is determined whether the shutter button has been pressed. If the shutter button has been pressed, the step S103 is executed and if the shutter button has not pressed, the method returns to the step S101 and the image capture is at a standby mode.

Step 3: As shown in step S103. The image capture executes the operation of capturing the motion images and stores a first motion image data with a first resolution, wherein the frame rate of the first motion image data is n frames/second.

Step 4: As shown in step S104. When the motion images are being captured, the state of the shutter button is determined. If the state of the shutter button has not been changed, the step S108 is executed. If the shutter button is half-pressed, the step S105 is executed. If the shutter button has been further pressed, the step S108 is executed.

Step 5: As shown in step S105. The image capture device enters to a still image capture mode and executes an image preview operation. During the step S105, the preview image data is transformed into an image preview data with the first resolution.

Step 6: As shown in step S106. During the image preview operation, the state of the shutter button is determined. If the shutter button is still half-pressed, the step S105 is executed. If the shutter button is further pressed from the half-pressed state, the step S107 is executed.

Step 7: The still image capture operation is executed and a time counting operation is executed. When the still image is completely captured, the time counting operation is stopped and a time period is acquired. The captured still images is compressed and stored in a still image file. The captured still images are transformed into a second temporal motion data with the first resolution according to the value of P which is calculated based on the value n in step 3 and the time period, wherein the second temporal motion data comprises P frames of the still image data. The second motion data is then generated by sequentially combining the first motion image data, the preview image data and the second temporal motion data. When the aforementioned operations in step 7 are completely executed, the image capture device executes the operation of capturing the motion images.

Step 8: As shown in step S108. Here, the image capture device stops the operation of capturing the motion images and returns to the standby mode.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image data processing method to capture still images while capturing motion images, comprising:
   (A) stopping capturing a motion image according to a first instruction to generate a first motion image data with a first resolution, thereafter, carrying out live view at a predetermined time;
   (B) outputting the image data in the predetermined time and generating a first temporal motion data with a second resolution;
   (C) capturing a still image data according to a second instruction after the predetermined time; and
   (D) transforming the first temporal motion data and the still image data and generating a second motion image data by combining the transformed data with the first motion image data.

2. The method as claimed in claim 1, wherein a frame rate of the first motion image data is n frames per second, wherein n is a positive integer.

3. The method as claimed in claim 2, wherein the step (D) further comprising:
   (E) transforming the still image data into a second temporal motion data with the first resolution, wherein the frame rate of the second temporal motion image data is n frames per second.

4. The method as claimed in claim 3, wherein the step (D) further comprising:
   (F) copying the still image data to generate the second temporal motion data having p frames of the still image data, wherein p/m=n, p is a positive integer, and m is a positive number.

5. The method as claimed in claim 1, wherein the execution time of step (C) is m seconds, wherein m is a positive number.

6. The method as claimed in claim 1, further comprising:
   (G) executing a focus operation, a white balancing operation and an exposure operation to an object being photographed within the predetermined time.

7. The method as claimed in claim 1, wherein the first resolution is the same as the second resolution.

8. The method as claimed in claim 1, wherein the first resolution is different from the second resolution.

* * * * *